United States Patent
Norlander et al.

(10) Patent No.: US 6,537,680 B1
(45) Date of Patent: Mar. 25, 2003

(54) PAPER OR PAPERBOARD LAMINATE AND METHOD TO PRODUCE SUCH A LAMINATE

(75) Inventors: Leif Norlander, Falun (SE); Annika Karlsson, Borlänge (SE); Mats Fredlund, Karlstad (SE)

(73) Assignee: Stora Kopparbergs Bergslags Aktiebolag (publ), Falun (SE)

( * ) Notice: Subject to any disclaimer, the term of this patent is extended or adjusted under 35 U.S.C. 154(b) by 0 days.

(21) Appl. No.: 09/763,834

(22) PCT Filed: Sep. 1, 1999

(86) PCT No.: PCT/SE99/01501

§ 371 (c)(1), (2), (4) Date: Feb. 27, 2001

(87) PCT Pub. No.: WO00/14333

PCT Pub. Date: Mar. 16, 2000

(30) Foreign Application Priority Data

Sep. 3, 1998 (SE) ................................. 9802967
Nov. 4, 1998 (SE) ................................. 9803756

(51) Int. Cl.$^7$ ............................................. B32B 23/04
(52) U.S. Cl. ...................... 428/532; 428/533; 428/534; 428/535; 428/536; 428/537.5; 162/123; 162/125; 162/129; 162/132; 162/135
(58) Field of Search ............................... 428/532, 533, 428/534, 535, 536, 537.5; 162/135, 129, 123, 125, 132

(56) References Cited

U.S. PATENT DOCUMENTS

| 4,913,773 A | 4/1990 | Knudsen et al. ............. 162/129 |
| 5,080,758 A | 1/1992 | Horng ......................... 162/130 |

FOREIGN PATENT DOCUMENTS

| CH | 633 482 | 12/1982 |
| SE | 8304454-2 | 8/1983 |
| WO | 95/26441 | 10/1995 |
| WO | 97/19198 | 5/1997 |
| WO | WO97/19198 | * 5/1997 |
| WO | 99/02777 | 1/1999 |
| WO | WO 99/02777 | * 1/1999 |

* cited by examiner

*Primary Examiner*—Leszek Kiliman
(74) *Attorney, Agent, or Firm*—Nixon & Vanderhye

(57) ABSTRACT

Paper or paperboard laminate composed of at least one bulk-promoting layer, here termed the bulk layer, and on at least one side at the bulk layer at least one secondary layer, secondary layer and bulk layer being joined to one another directly or indirectly over basically the whole of their surfaces facing one another, 40–95% of the bulk layer consists of cellulose fibers with a freeness of 550–950 ml CSF, the secondary layer/layers has/have a greater density than the bulk layer, and the laminate has a bending stiffness index higher than 2.5 Nm$^7$/kg$^3$, but less than 14 Nm$^7$/kg$^3$, calculated as a geometric mean value for machine and transverse direction.

88 Claims, 5 Drawing Sheets

PAPER OR PAPERBOARD LAMINATE AND METHOD TO PRODUCE SUCH A LAMINATE

TECHNICAL FIELD

The invention relates to a paper or paperboard laminate composed of at least one bulk-promoting layer, here termed bulk layer, and on at least one side of the bulk layer at least a secondary layer, the secondary layer and bulk layer being joined to one another directly or indirectly over basically the whole of their surfaces facing one another. The invention also relates to a method for producing such a laminate.

PRIOR ART

One of the most important attributes of paperboard material when used as packaging material is its stiffness. The stiffness of a paper or paperboard laminate is proportional to its thickness raised to the third power. This ratio means that a considerable saving in material can be achieved by reducing the density of the less loaded middle layers in a laminate. The ratio has long been known, but one difficulty has been to produce sufficiently stiff and strong middle layers which at the same time are of a low density.

Corrugated paperboard is a classic example of a paperboard laminate with good flexural rigidity in relation to the density of the laminate. Due to microcorrugation of the bulk-promoting middle layer, relatively thin laminates can also be produced, which are not however regarded as satisfying the maximum demands made on packaging material. Thus the wave-shaped pattern can often be discerned, which reduces the aesthetic value of the material.

In "Weyerhaeuser Paper Company introduces HBA (High Bulk Additive)", Elston and Graef describe the possibility of using chemically cross-linked fibres in paperboard material. By adding 10% HBA (High Bulk Additive) to the stock, the basis weight of the paperboard material can be reduced by 25%, with a sheet of the same flexural rigidity as a control sample without the addition of HBA. The thickness of the sheet can be retained, the density being reduced instead in one example from 705 to 500 kg/m$^3$. Taber stiffness is shown to increase by approx. 40% with the addition of 15% HBA. However, this results in reduced tensile strength, approx. -25%. Admixing has been performed inter alia on a three-layer laminate, all the HBA being put into the middle layer.

WO95/26441 likewise describes the use of a chemically cross-linked fibre in paper laminate with two or more layers. The object of using the cross-linked fibre (HBA) is to achieve a construction of increased bulk while retaining the tensile strength. Paper material of low density (high bulk) normally gives lower tensile strengths. To reduce this negative effect of low density, the use is proposed of waterborne binders sirch as starch, modified starch, polyvinyl acetate and polyvinyl alcohol etc. It is proposed to use these binders in percentages of between 0.1 and 6% of the material's weight. The flexural rigidity achieved is expressed in Taber units. If the same method is used for converting stiffness as described below under test methods, then the result in WO95/26441, Example 5, corresponds to a bending stiffness index of approx. 1.6 Nm$^7$/kg$^3$.

Dry forming in the manufacture of paper has been described in literature in a large number of articles and patents. In "An introduction to dry forming of paper", Tappi, 1978, pp. 3–6, amongst others, Swenson describes various techniques for forming a web using air as a dispersing medium for wood fibres. Here examples are given of products which are manufactured by dry forming, e.g. soft hand towels, stiff paperboard and masonite.

In GB 1,430,760 and GB 1,435,703 a forming technique is described for producing paper material with several layers. It is proposed inter alia to combine dry- or wet-formed layers with one another. It is proposed that consolidation of the sheet (consisting of several layers) is done by using binders, moisture and pressing at high temperature. Product attributes for dried-out products are characterized by high bulk, squareness (i.e. same properties in different directions of the sheet in a plane) and good dimensional stability. Furthermore, it is considered possible to achieve product attributes similar to conventionally formed paperboard. The manufacturing technique is considered to reduce investment costs, water and energy consumption.

In "Where research pays off", PPI, March 1977, pp. 42–26, Haas describes certain important product attributes for conventionally wet-formed and dry-formed paperboard. Haas describes the attributes of the dry-formed sheets as having an even surface with a lack of felt and wire markings and an approved tear strength. Stiffness is reported using numerical values for the various manufacturing techniques, but not commented on in the text. The dry-formed multilayer materials have not produced increased stiffness. In interpreting the document here it has been assumed that "stiffness %" or "stiffness X" means the stiffness of the sheets in a transverse or longitudinal direction (TR or MR). In the event of conversion for better comparison between different materials, the bending stiffness index can be calculated as the geometric mean value of MR and TR (the square root of MR*TR), a maximum bending stiffness index achieved according to the values reported by Haas being approx. 1.2 Nm$^7$/kg$^3$. It is thus perceived here that dry forming techniques such as have been applied have not contributed to increased flexural rigidity. Haas also reports the basis weight and thickness of the different paper constructions, 550 k/m$^3$ appearing to be the lowest density produced for the wholly or partly dry-formed constructions.

In "Dry forming of paperboard: a look at its history and technology", Pulp and Paper, 54, 1980:4, pp. 120–123 Attwood reports on experiments inter alia with paper constructions which combine dry-formed and wet-formed layers. The results reported with regard to stiffness and thickness (at the same basis weight) point to great differences in stiffness in machine (MR) and cross machine direction (TR). The maximum stiffness converted as the square root of stiffness MR*TR was obtained for material which had been produced with wet-formed outer layers and dry-formed middle layers, no values in excess of 1 Nm$^7$/kg$^3$ having been achieved, however. Furthermore, Attwood reports various proposals for methods of designing a process which combines dry-formed middle layers with wet-formed outer layers. Attwood also reports the basis weight and thickness of the different paper constructions, approx. 600 kg/m$^3$ appearing to be the lowest density produced for the wholly or partly dry-formed constructions.

U.S. Pat. No. 4,914,773 reports methods of producing stiff paperboard material by using dryly exposed fibres with a freeness of 500 CSF. The fibres which are to be formed into the middle layer in a sheet are to be dispersed in foam. This has the object of preventing them from being wetted with water to too great an extent. The addition of different types of binder such as latex, starch, gums etc. is specified as necessary preconditions for achieving adequate strength of the sheet. When the flexural rigidities reported are converted it is clear that the maximum bending stiffness index achieved is approx. 1.8 Nm$^7$/kg$^3$.

DESCRIPTION OF THE INVENTION

It has turned out surprisingly to be the case that by using fibres with a freeness of 550–950 ml CSF, preferably fibres with a freeness value higher than 600 ml CSF, at best higher than 650 but less than 850 ml CSF, and best of all higher than 700 ml CSF, in a bulk-promoting layer in the laminate, termed bulk layer below, in combination with a secondary layer on one or both sides of the bulk layer, a laminate can be obtained which exhibits very great stiffness. The advantage is also hereby achieved that the laminate has a lower density, and thereby lower material consumption compared with previously known paperboard laminates intended for the same type of use as the laminate according to the invention, such as material for packaging of liquid and solid foodstuffs and also for wrapping and packing industrial goods and other goods, or as an intermediate product for the manufacture of such material or other end products. A paper or paperboard laminate is presented by means of the invention with a bending stiffness index greater than 2.5 and lower than 14 $Nm^7/kg^3$, which is a bending stiffness index more than 2–7 times higher compared with multilayer paperboard conventionally produced today. At the same time, the laminate has sufficient strength in the bulk layer, which normally constitutes the middle layer in the laminate, to facilitate folding and subsequent creasing of the material. A particular advantage of the invention is that after folding it can be creased without obstruction both to and from the fold impression.

The bulk layer has a very low density, 50–300 $kg/m^3$, preferably 70–200 $kg/m^3$, at best 100–180 $kg/m^3$ and a basis weight of 30–300 $g/m^2$. According to a conceivable embodiment it has a basis weight of 40–80 $g/m^2$, and according to another embodiment a basis weight of 70–120 $g/m^2$. According to another aspect of the invention, the bulk layer has a thickness of 0.1–6 mm, preferably 0.2–1.0 mm, at best 0.3–0.7 mm.

Said secondary layer has a considerably greater density and tensile strength than the bulk layer, e.g. a density which is at least twice as great, preferably at least three times as great and best of all at least four times as great as the density of the bulk layer. Thus the secondary layer can have a density of 300–1500 $kg/m^3$, preferably 400–850 $kg/m^3$. The average thickness of the secondary layer/the individual secondary layers is typically only 3–20%, preferably a maximum of 15%, at best a maximum of 10% of the thickness of the bulk layer.

A laminate according to the invention consisting of one bulk layer and one secondary layer on at least one side of the bulk layer, preferably on both its sides, has a basis weight of between 50 and 500 $g/m^2$. Within the said interval, a laminate composed according to the invention can have a basis weight which depends on the reciprocal relationships between the thicknesses and densities of the bulk layer and the secondary layers. Thus when the bulk layer is relatively thick, the laminate can have a basis weight of 75–400 $g/m^2$, preferably 100–350 $g/m^2$, at best 100–250 $g/m^2$ or 90–200 $g/m^2$. If on the other hand the bulk layer is relatively thin, the laminate can have a basis weight of 300–500 $g/m^2$, preferably 350–450 $g/m^2$. In other words, the secondary layer/secondary layers dominate weight-wise in this case. An intermediate case is also conceivable, when the laminate consisting of said layers has a basis weight of 200–400 $g/m^2$, preferably 250–350 $g/m^2$.

The tensile index of the laminate according to the invention can amount to 25–150 Nm/g, preferably 50–100 Nm/g.

During manufacture, the bulk layer is laminated using binders and with controllable pressure and time to said secondary layer with high tensile strength to form a laminate according to the invention. Lamination can be carried out advantageously at the same time as the bulk layer is consolidated. However, this is not a prerequisite, on the contrary, it is equally possible to first form and consolidate the bulk layer by drying, this then being laminated to the desired secondary layer.

Said bulk layer of low density can advantageously be produced by dry forming or by wet forming of chemi-thermomechanical pulp (CTMP) or another "mechanical" pulp based on softwood fibres, e.g. TMP, with a high freeness. Dry forming is preferable from one aspect, it being possible to use any known technique for this, but regardless of the forming technique the freeness of the pulp should be higher than 550 CSF, preferably higher than 600 CSF and even more preferredly higher than 650 CSF, best of all higher than 700 CSF. A high freeness of the fibre material for said first layer ensures that the sheet can be pressed on dewatering and consolidation of the sheet without the density increasing to an undesired extent. Other raw fibre materials with high wet resilience can also be included in the bulk layer to a certain degree, e.g. chemically cross-linked fibres, which often have a slight dewatering resistance and high resilience after wet pressing, but are not to be preferred at least for cost reasons.

Further conceivable raw fibre materials are synthetic fibres, e.g. polyester, polyethylene and polypropylene fibres, which also exhibit a low resistance to dewatering and high resilience in the wet state. In a preferred embodiment, the raw material for the layer with low density for the bulk layer, which is normally to form the middle layer in the laminate, is selected wholly or mainly from mechanically produced, so-called high-yield pulps, i.e. pulps with at least 75%, suitably at least 80% wood yield, such as CTMP and TMP pulps for example, based mainly on softwood fibres, with the prerequisite that the pulps have the freeness values specified above.

Waste matter can also be added to the bulk layer up to 40% of the dry weight. Waste is defined here as reject paper or paperboard laminate product which has been flailed in a pulper and with mainly exposed fibres.

The laminate according to the invention is constructed in a preferred embodiment of three layers, with two or more than three layers being conceivable, said bulk layer preferably being laminated together with the secondary layers on both sides. However, it is conceivable for a secondary layer to be present only on one side of the laminate. This/these secondary layer(s) can be produced advantageously in the same plant as the bulk layer, but also manufactured separately in order to be laminated to the bulk layer in a separate installation.

No restrictive meaning is to be imposed by the expression "secondary" layer. There can thus be further layers, e.g. barrier layers, on top of the secondary layer/layers, or between any secondary layers and the bulk layer. It should also be understood that the secondary layers/surface layers; secondary layer/surface layer can be coated to improve printability. Typically the preferably coated layers are coated in turn with a plastic layer or are intended to be plastic-coated if the laminate is an intermediate product, in order in a manner known in itself to make the laminate waterproof and heat-sealable for it to be able to be used for liquid packagings. The secondary layers/surface layers can thus have several functions in combination with the bulk layer, such as making the laminate impermeable to liquid and steam, heat-sealable and giving the desired tensile strength and bending strength.

According to an aspect of the invention, at least one secondary layer of the laminate is permeable to steam, this secondary layer being formed by stock with a dewatering resistance higher than 20° SR, preferably higher than 25° SR but not higher than 65° SR, preferably not higher than 40° SR, to ensure the removal of water on thermal drying. It is presupposed that the laminate on this side of the bulk layer does not contain any other layer either which is impermeable to steam during the drying process. The permeable surface layer/layers are best constituted by wet-formed paper with a "Gurley" air permeance of more than 2 $\mu$m/Pa*s which is preferably produced as a chemical pulp of softwood and/or hardwood.

To achieve necessary strength in the thickness direction (z-direction) and with regard to flexural rigidity, binders are added, preferably latex binders, in a quantity of 1–30% of the weight of the laminate, suitably 5–30%, preferably 7–30% and even more preferredly 10–20% calculated as dry weights. These polymer binders can be added dissolved and/or dispersed in water by applying spray directly to the bulk layer and/or the secondary layers in order to be transferred with these to the bulk layer and penetrate it. Various types of coating systems can also be used to add binders to the secondary layers. Coating can thus be carried out using blade coaters, directly or indirectly using roller coaters.

According to an embodiment of the invention, high flexural rigidity and good strength in the thickness direction are achieved in the laminate with relatively low basis weights of the bulk layer even with low percentages of binders, i.e. binder percentages preferably of latex binders of as little as 1–5% of the weight of the laminate, preferably 2–5% of the laminate's weight. The bulk layer should here have a basis weight of 30–100 g/m$^2$, preferably 30–80 g/m$^2$.

Without limiting the invention to a certain theory, one reason that low percentages of binder are sufficient with low basis weights of the bulk layer is believed to be that the binder does not follow with the water to the surfaces to the same extent in connection with drying when the laminate thickness is smaller. As binders are a relatively expensive raw material in the laminate, every % unit reduction of binders signifies major savings.

Latex is best used as a binder in the bulk layer in the above specified percentage and another binder, e.g. starch, carboxymethyl cellulose or gums to achieve bonding between the secondary layer and bulk layer.

Suitable binders for penetrating the bulk layer can be diluted in water, i.e. are soluble or dispersible in water and are selected preferably from the group consisting of water-soluble polymers, or aqueous dispersions of polymers, such as polyvinyl acetate, polyvinyl alcohol, polyacrylates, polyacrylic acid, polyethylene, acrylamide, polystyrene and maleic acid derivative in the form of homo- and copolymers of said polymers, or possibly from the group consisting of starch, carboxymethyl cellulose and gums, the latter group being particularly suitable for use with the aim of achieving bonding between various fibre-based layers.

Furthermore, the different layers with fibres can contain hydrophobic rendering additives such as AKD adhesive (alkyl ketene dimer adhesive), resin glue, silicon-based and fluorinating substances etc. in a quantity corresponding to a maximum of 2% of the respective layer weight.

According to one aspect of the invention, at least one of the secondary layers can have been formed and pressed in a separate stage/separate stages before being laminated to the bulk layer. The objective is to increase the dry content and increase the tensile strength of the surface layers separately without pressing said bulk layer to such an extent that its low density is lost. Consolidation of the multilayer laminate with the help of binders can thus be carried out in pressing conditions which are not determined by the need for the secondary layers to be pressed for consolidation. A drying stage with heat can possibly be inserted to adjust the dry content to the desired level prior to combination and joining of the various layers.

To distribute the binder in the bulk layer, which normally forms the middle layer, the material is best pressed in one or more press nips before drying. The pressing is carried out in such a way that the density of the bulk layer does not exceed the limits set above after drying. Pressing on lamination can be carried out advantageously between rollers or belts without removing the water. The quantity of water which is to be dried away by the use of heat can also be reduced by using a press section of the type which is used in conventional paper machines, or as a combination. If water is removed in the pressing operation, however, there can be a risk of losing the binders, which constitutes an environmental and economic disadvantage.

Following the press, the laminate is dried in conventional drying equipment such as a cylinder dryer with or without dryer wire/felt, an air dryer, metal belt etc. Following drying or during a suitable break in the drying process, the material can be coated. Alternatively, secondary layers are used with one or two coated surfaces.

To further reinforce its attributes as packaging material, the laminate can be completed by layers which can be surface layers or intermediate layers, and which constitute barrier layers in the form of films of various polymers, polyethylene, polypropylene, polybutene, polyester, polyvinyl and/or vinylidene chloride, polyvinyl alcohol, polyethylene vinyl alcohol co-polymer, ethylene vinyl acetate co-polymers and cellulose esters in one or more layers or aluminium foil or metallized polymer film. Said barrier layers can also be placed directly against the porous bulk layer, the binder in this case contributing to giving the final laminate the necessary strength. In this case, however, the laminate must be permeable to steam on one side of the bulk layer to ensure the removal of steam. In the event that the barrier layers are intended to be laminated directly to the bulk layer, it is also essential that it does not have a yield point which is lower than the surface temperature of the drying cylinders, normally 130–180° C.

The laminate according to the invention is used preferably for food packaging or packaging for consumer products of various types etc. Also dried laminate of said type serves well as protection during the storage and transportation of goods for industrial use.

The new paper laminate has a major advantage in that it produces less waste of raw materials to achieve a certain level of stiffness in a packaging material. This means reduced costs and/or reduced environmental pollution in relation to the transportation of timber raw materials and end products. Total energy consumption is thereby reduced in manufacturing the paper laminate according to the invention compared with conventional paperboard manufacture. The consumption of electrical energy is also reduced in manufacturing TMP or CTMP raw fibre materials with the desired attributes. These raw fibre materials are also considerably cheaper to manufacture than chemically cross-linked fibres and chemically produced softwood pulps according to the sulphite or sulphate processes.

Further aspects and features of the laminate according to the invention and the method for producing the laminate are evident from the following patent claims and the following description of some conceivable methods of producing the laminate and a number of conceivable embodiments of the laminate together with experiments carried out.

BRIEF DESCRIPTION OF DRAWINGS

In the following description reference will be made to the enclosed drawings, of which

DESCRIPTION OF METHOD AND ARRANGEMENTS FOR MANUFACTURING THE LAMINATE

Figure 1:
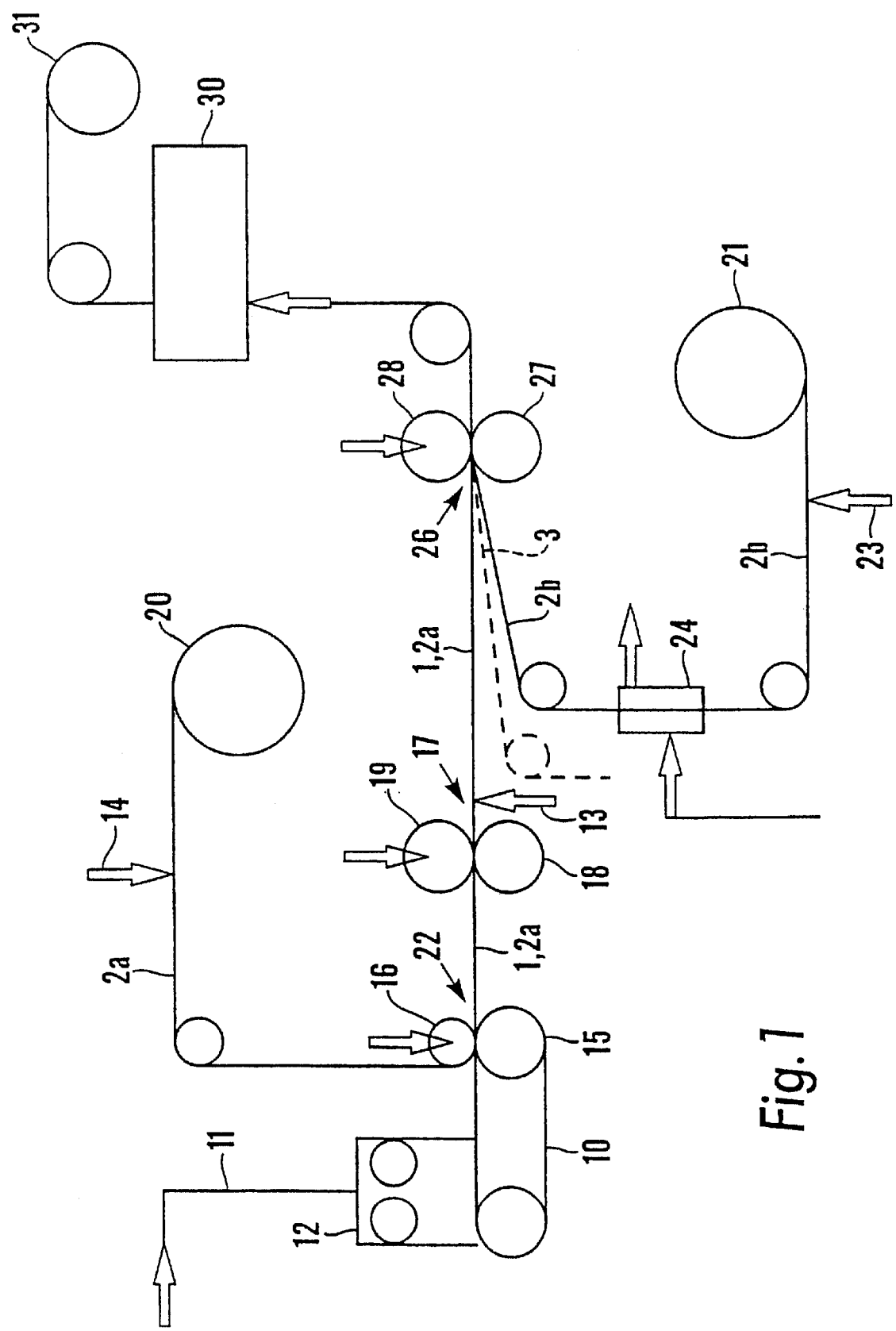
FIG. 1 shows in diagrammatic form a pilot plant according to a first conceivable embodiment for the manufacture of a paperboard laminate according to the invention.

The bulk layer (bulk layer), which is designated 1 in the drawings and is of very low density, is laminated together with dry- or wet-formed secondary layers of considerably greater density. These secondary layers have been designated 2, 2a and 2b in the drawings. They can advantageously be produced in the same installation, but also manufactured separately in order to be laminated to the bulk layer of low density in the device according to the invention. According to one aspect of the invention, at least one of the secondary layers has thus been formed and pressed in a separate stage/separate stages before it is laminated to the bulk layer 1. The objective is to increase the dry content and increase the tensile strength of the secondary layers separately without pressing the bulk layer to such an extent that its low density is lost. Consolidation of the multilayer laminate with the aid of binders can thereby be effected in conditions when pressing which are not determined by the need for the secondary layers to be pressed for consolidation. A drying stage with heat can be introduced if applicable to adjust the dry content to the desired level for combining and joining the various layers.

To achieve the required strength in the thickness direction (z-direction) and with regard to flexural rigidity, polymer binders which are dissolved and/or dispersed, i.e. soluble, in water are added directly to the bulk layer and/or secondary layers. The quantity of binders shall amount to 1–30% of the construction's weight, suitably 5–30%, preferably 7–30% and even more preferredly 10–20%. Or, in the case of low basis weights of the bulk layer, 1–5%, preferably 2–5% of the construction's weight. Said binder solution and/or dispersion can be added by using a spray directly to the bulk layer and/or to the secondary layers. Other techniques for adding binders are however conceivable, in particular for adding binders to the secondary layers, such as various types of coating systems. Thus it is judged possible to execute coating using blade coaters, directly and indirectly using roller coaters. It is judged to be suitable to use latex binders for penetration of the bulk layer and another binder, e.g. starch, carboxymethyl cellulose and gums for achieving bonding between various fibre-based layers, including between the bulk layer 1 and said secondary layers 2, 2a, 2b.

Apart from latex binders, suitable binders for penetrating the bulk layer are other water-soluble polymers, or aqueous dispersions of polymers, which are selected from the group consisting of polyvinyl acetate, polyvinyl alcohol, polyacrylates, polyacrylic acid, polyethylene, acrylamide, polystyrene and maleic acid derivative in the form of homo- and copolymers of said polymers. Wetting agents can also be applied together with the binder or agents, e.g. sodium dodecyl sulphate, hydrophobic rendering agents and any other desired ingredients.

To get the polymer binder to penetrate and be distributed in the bulk layer, the material is best pressed in one or more press nips before drying. The pressing is carried out in such a manner that the density of said bulk layer after drying does not exceed the limits set above. For example, pressing on lamination can advantageously be carried out between rollers or belts without removing the water to a significant degree. The amount of water which is to be dried away using heat can also be reduced by using a press part of the type which is used in conventional paper machines, or as a combination. If water is removed in the pressing operation, however, there can be a risk that the binders are lost, which is environmentally and economically disadvantageous. However, pressing on lamination has the advantage that it contributes to distribution of the binders in the sheet's z-direction.

After the press, the laminate is dried in conventional drying equipment, such as a cylinder dryer with or without dryer wire/felt, air dryer, metal belt etc. Following drying or during a suitable break in the drying process, the laminate can be coated. Alternatively, secondary layers are used which are coated in advance on one or both sides. The laminate can finally be surface-coated with various polymers to further reinforce its attributes as packaging material. Such coating layers or surface layers, which have little or no permeability to water, steam, carbon dioxide and oxygen and thereby constitute barrier layers for such fluids, can be formed by films of different polymers, such as polyethylene, polypropylene, polybutene, polyester, polyvinyl and/or vinylidene chloride, polyvinyl alcohol, polyethylene vinyl alcohol co-polymers, ethylene vinyl acetate copolymers and cellulose esters in one or more layers or aluminium foil or metallized polymer film. Said barrier layers can also be placed directly against the porous bulk layer, the binder in this case contributing to giving the final laminate the required strength. In such a case, however, the secondary layer and any further layers on the opposite side of the laminate must be permeable to steam to ensure the removal of steam. In the event that barrier layers are laminated directly onto the bulk layer 1, it is also essential that they do not have a yield point which is lower than the outer temperature of the drying cylinders, which is normally 130–180° C.

With reference now to FIG. 1, a flat wire in a pilot installation is described by the number 10. A feed pipe 11 supplies a stock of CTMP pulp to an inlet box 12. CTMP pulp has the degree of freeness characteristic for the invention which has been specified above and which is also indicated in the following patent claims, which freeness is achieved by adapting the temperature and energy supplied in preparation of the pulp according to known technology, e.g. according to the principles stated in Swedish published patent application 9000515-8. The CTMP stock is routed from the inlet box 12 out onto the wire 10. The first secondary layer 2a is moistened with water by means of a spray unit 14 on the side which is to face the bulk layer, which shall be formed by the stock on the wire 10, to prevent curl. The secondary layer 2a consists according to the embodiment of paper manufactured principally of softwood according to a chemical pulp production method, preferably the sulphate cellulose method. The paper 2a can be produced in a separate plant and also supplied by a completely different manufacturer and unwound in this case from a first supply roll 20. Alternatively, the paper 2a can be produced in a machine integrated with the arrangement according to the invention for manufacturing the laminate according to the invention in line, as in a corrugated board mill, the secondary layer 2a corresponding to a liner. Furthermore, the secondary layers 2a, 2b can be formed very satisfactorily from paper with the same character as liner in corrugated board.

The moistened secondary layer 2a and bulk layer 1 formed on the wire are joined to one another surface to surface between a couch roll 15 and a press roller 16. The couch roll 15 and the first press roller 16 form a first press nip 22. The two joined layers 1, 2a then pass a second press nip 17 in a single-felted press with dewatering consisting of a roll 18 and roll 19. The water is hereby transferred through the secondary layers 2a to the press felt, which is dewatered in turn by felt suction boxes of the conventional type. Latex or another polymer binder is added to the layers on the bulk layer side 1 as above as an aqueous dispersion/solution via a spray unit 13.

A second secondary layer 2b can be of the same type as the first layer 2a and manufactured in a separate plant, in which case it is unwound from a second supply roll 21, or produced in line, as described for the first layer 2a above. However, material of another type is also conceivable in said second secondary layer 2b, e.g. plastic film. It is however presupposed in this case that the secondary layer 2b is also formed by a paper layer, preferably paper produced from chemical pulp. The secondary layer 2b is moistened here by means of a third water spray unit 23 on the side which is to face the bulk layer 1 on the opposite side relative to the secondary layer 2a. The secondary layer 2b is then provided on the same side with binders in a coating unit 24, which can be formed by a spray unit or coating unit, e.g. a blade coater with direct coating onto the layer 2b or via roller (roller coater). Starch is best used as a binder in the coating unit 24 or another suitable binder, e.g. carboxymethyl cellulose and/or gums, to achieve bonding between the secondary layer 2b and the bulk layer 1.

The three layers 2a, 1 and 2b are then joined to one another in a third press nip 26 between two press rolls 27 and 28 with little or no dewatering, but under such great pressing pressure that the distribution and penetration into the bulk layer 1 of the binder added by way of introduction is stimulated. The laminate thus consolidated, consisting of the three layers 2a and 2b is then routed to a drying unit generally designated 30 to be wound finally on roll 31. The laminate 31 can then be provided in a separate plant with outer barrier layers. Alternatively this can be carried out in line following the drying unit 30 for rolling up on a roll or cutting into sheets.

It is also possible to add a barrier layer consisting of aluminium foil 3, or metallized plastic film between the bulk layer 1 and the secondary layer 2b, which is carried out between said second press nip 17 and said third press nip 26. In this case binder is added to said foil/barrier layer 3 on the side which is to face the bulk layer 1 via a fifth spray or coating unit (not shown). This binder can be of the same character as added to the secondary layer 2b in unit 24. It is understood that in this case drying of the bulk layer 1 in the drying unit 30 takes place via the secondary layer 2a on the opposite side of the bulk layer 1 relative to the barrier layer 3.

Figure 1B:
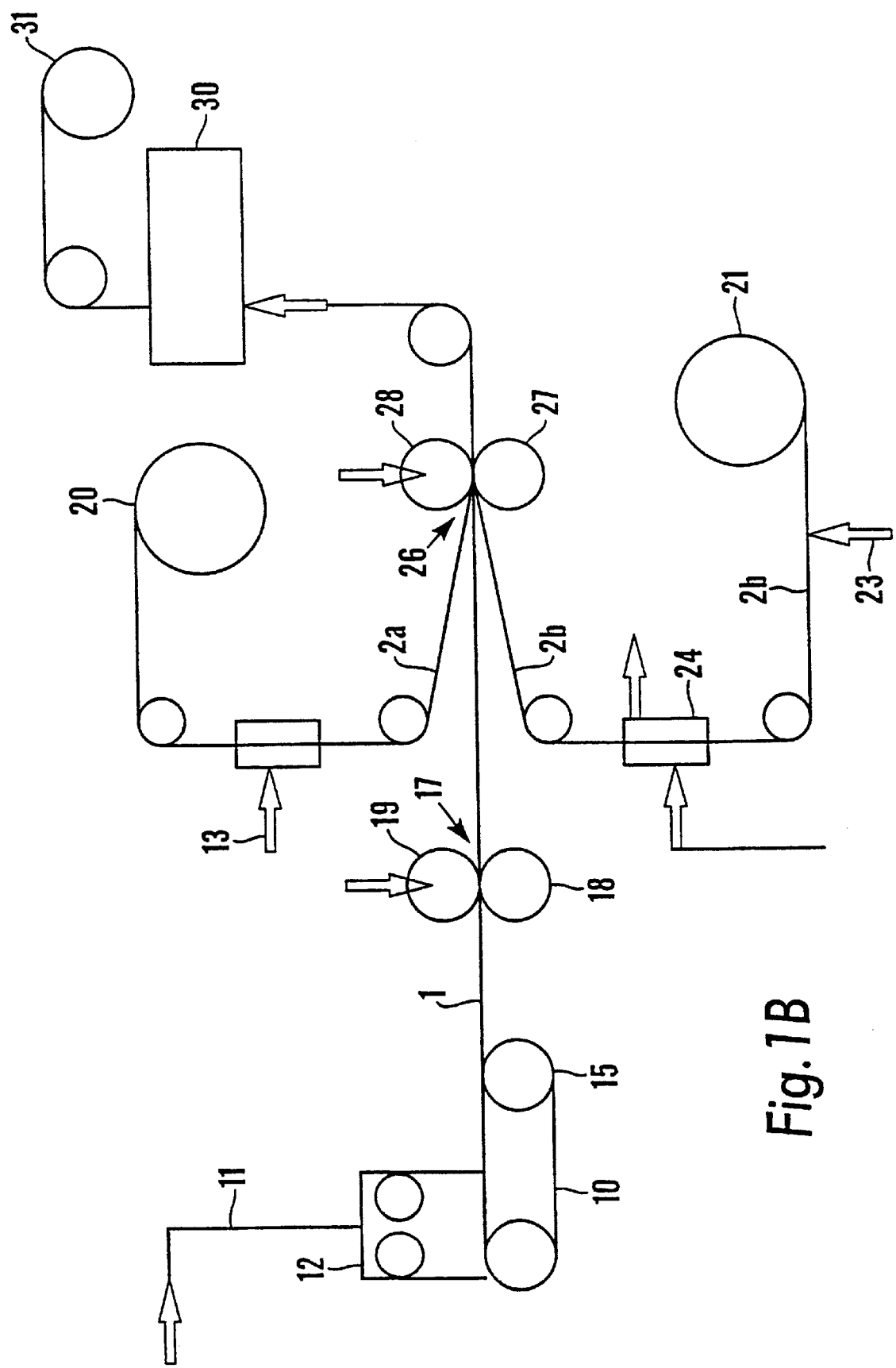
FIG. 1B shows in diagrammatic form a variant of the first embodiment according to FIG. 1.

FIG. 1B shows a variant of the embodiment described above with reference to FIG. 1. In this case also forming is carried out wet, but the bulk layer 1 is dewatered in press 17 prior to combination with the secondary layers 2a and 2b. Binders are added to the secondary layers in the units 13 and 24 on the sides which will face the bulk layer 1. In this case also the binder can be added by spraying or coating.

The methods described of manufacturing the laminate according to the invention, comprising wet-forming of the bulk layer 1, doubtless have certain advantages, not least from the cost point of view. However, the invention also offers a method of manufacturing the laminate comprising dry-forming of the bulk layer 1.

Figure 2:
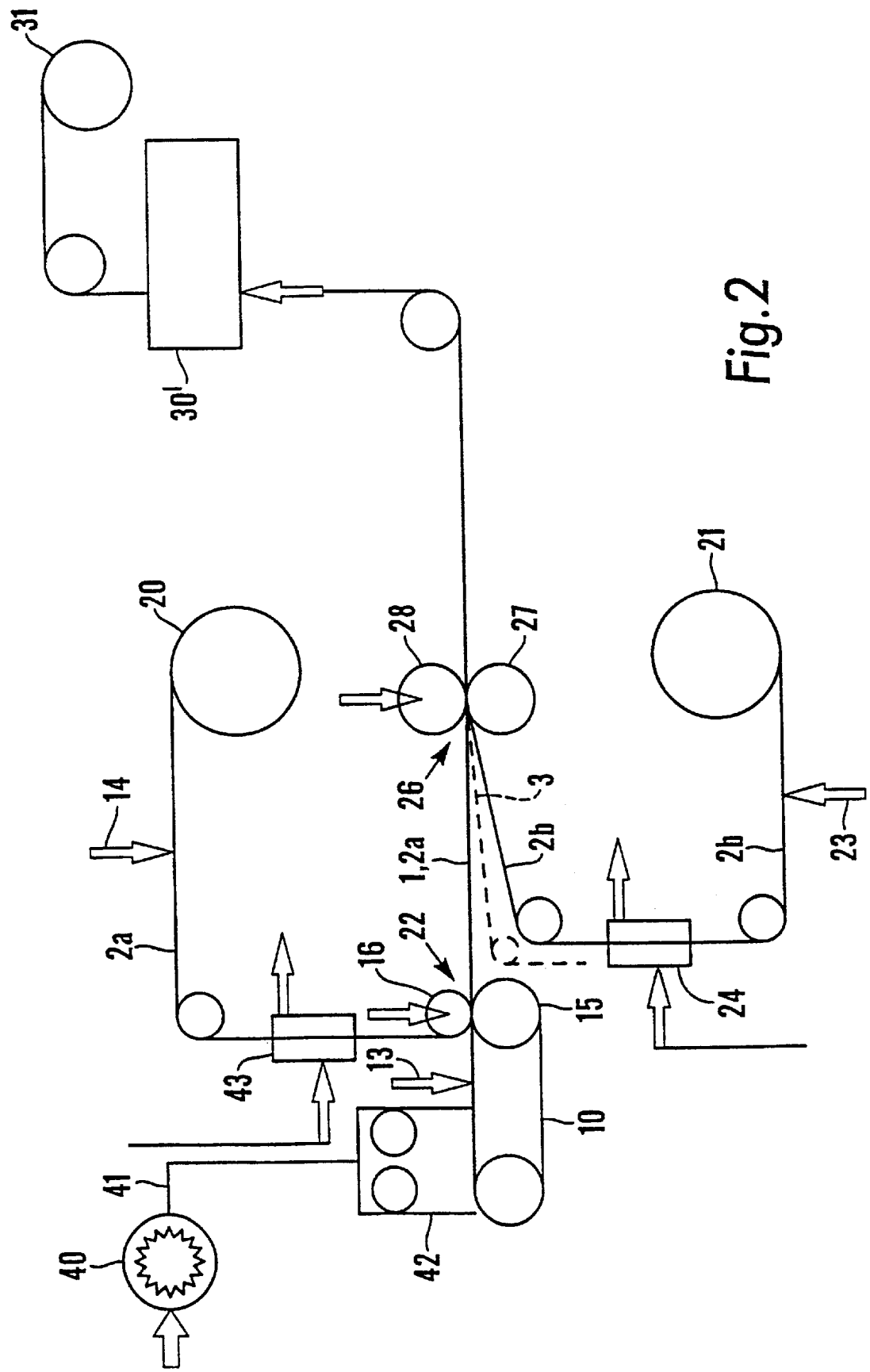
FIG. 2 shows in diagrammatic form a pilot plant according to another conceivable embodiment for the manufacture of the laminate according to the invention.

With reference to FIG. 2, which also shows a pilot plant, a hammer mill 2 is designated by the figure 40. Dry CTM? fluff is fed into this, which fluff is processed in the hammer mill so that the fibres are exposed. The CTMP pulp has been rolled or produced in a separate process in such a manner that the degree of freeness typical of the invention is obtained in said pulp if this is beaten up in water. With regard to freeness of the pulp which is to form the bulk layer, reference is made to the above and to the following patent claims, and regarding the method of producing such a pulp reference is also made to what was said in the above. The fluff pulp thus processed is transported via air transportation 41 to a forming case 42, from where the dry fibre pulp is formed into a sheet on the wire 10. Latex or another polymer binder according to the above is added to the CTMP sheet on the wire as an aqueous dispersion/solution via a first spray unit 13. Other parts of the method of producing the laminate are basically as in the embodiment according to FIG. 1. However, binders are also added to the first secondary layer 2a in a ventilated binder applicator 43 on the side which is to face the bulk layer 1. The binder applicator 43 can be of the same type as the ventilated binder applicator 24, and the binder or agents added by means of the binder applicator 43 can be of the same type as added by means of binder applicator 24. One difference in relation to the preceding embodiment is also that no dewatering is required between the presses 22 and 26. Regarding the equipment and procedure otherwise reference is made to the above description of the installation according to FIG. 1.

Regardless of the manufacturing technique, a basic principle of the method according to the invention is that a layer of high bulk is created, which is normally to form the middle layer in the laminate, that this bulk layer is joined to one or more secondary layers, which are in themselves consolidated on lamination, and that lamination is then carried out in such a way (low pressing pressure in combination with high resilience and dewaterability of the bulk layer) that the bulk in the bulk layer is not essentially lost.

It should also be understood in this regard that all layers which are to be included in the laminate can be produced and prepared by themselves, also including the bulk layer, in order then to be laminated together by lining. In this process the bulk layer has sufficient strength due to the binder added to be able to be wound up on a roll, unrolled, guided etc., and joined to the secondary layers by pasting

EMBODIMENTS OF THE LAMINATE ACCORDING TO THE INVENTION

FIG. 3–FIG. 7 show a number of conceivable embodiments of the laminate according to the invention. It is to be understood that the embodiments shown only constitute a number of illustrative examples and that a number of other embodiments are conceivable within the scope of the invention. The number, character and positioning of the different layers for example can thus be varied and supplemented without deviating from the fundamental principles of the invention, such as expressed in the following patent claims.

EXAMPLE 1

FIG. 3

The laminate L1 according to the embodiment consists of only two layers, namely a bulk layer 1 with the low density and high degree of freeness typical of the invention and a secondary layer 2. The secondary layer 2 consists typically of a paper layer but can in principle also be formed by a non-fibrous layer, e.g. a plastic film, of considerably greater density than the bulk layer 1 and also rolled and joined to the bulk layer 1 so that the consolidated laminate gains the characteristic attributes for the laminate according to the invention. The laminate L1 does not need to be an end product but is preferably an intermediate product.

EXAMPLE 2

FIG. 4

Figure 3:
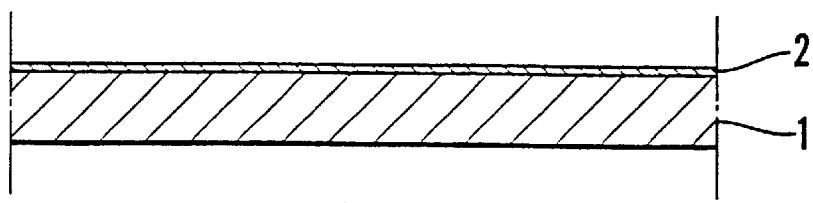
FIG. 3 shows in diagrammatic form a laminate in cross-section according to a first conceivable embodiment according to the invention.
Figure 4:
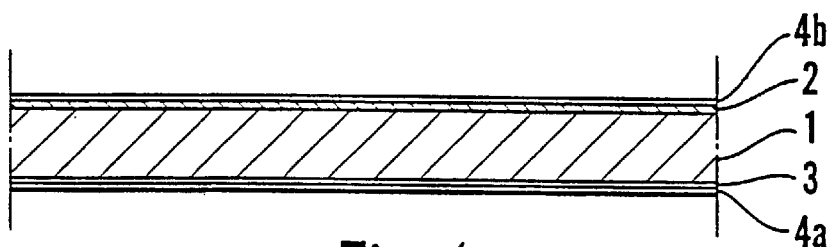
FIG. 4 shows in diagrammatic form a laminate in cross-section according to a second conceivable embodiment according to the invention.
Figure 5:
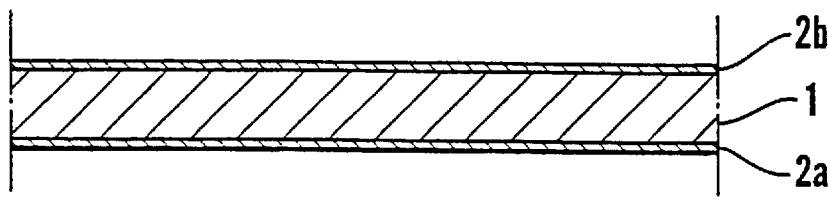
FIG. 5 shows in diagrammatic form a laminate in cross-section according to a third conceivable embodiment according to the invention.
Figure 6:
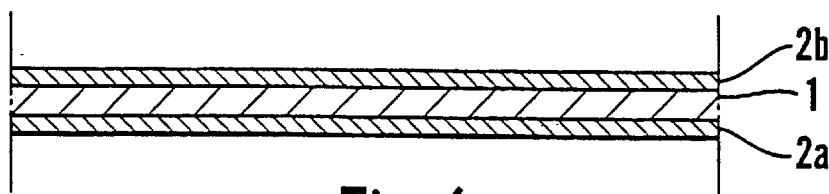
FIG. 6 shows in diagrammatic form a laminate in cross-section according to a fourth conceivable embodiment according to the invention.
Figure 7:
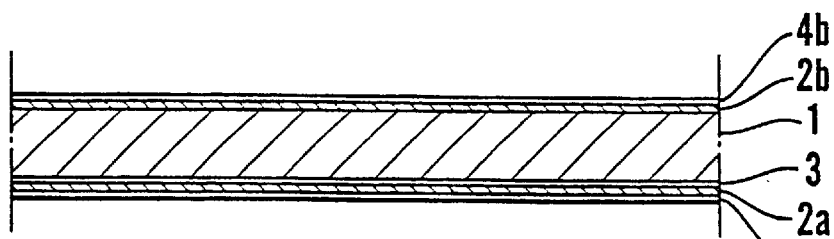
FIG. 7 shows in diagrammatic form a laminate in cross-section according to a fifth conceivable embodiment according to the invention.

Starting out from the laminate L1, FIG. 3, a barrier layer 3 on the one hand, which lies adjacent to the bulk layer 1 and can be formed e.g. by an aluminium foil, and on the outside a pair of surface layers 4a and 4b, consisting of plastic film on the other hand, have been added in the laminate L2.

EXAMPLE 3

FIG. 5

This example illustrates a paperboard material for which the invention is primarily intended to be used. This laminate L3 is constructed of a thick but light, bulk-promoting middle layer of fibres with said degree of freeness and on both sides of it a secondary layer 2a or 2b consisting normally of a paper layer of considerably greater density and tensile strength than the bulk layer 1, preferably paper layers which are much thinner than the bulk layer 1 and produced by means of a chemical pulp manufacturing method.

EXAMPLE 4

FIG. 6

The difference in relation to the previous example 3 is that the bulk layer 1 in the laminate L4 is relatively thin, while the two secondary layers are thicker or at least have a considerable thickness in relation to the bulk layer.

EXAMPLE 5

FIG. 7

The laminate L5 consists of a core of bulk-promoting material according to the invention and on the outside plastic films 4a or 4b. Nearest to the bulk layer 1 on one side is a barrier layer 3 of aluminium foil and between the aluminium foil 3 and the surface layer 4a of plastic is a paper layer 2a produced from chemical pulp. On the other side between the bulk layer 1 and the surface layer 4b of plastic is a secondary layer 2b of paper, which can be of the same type as the layer 2a.

The surface layers 4a and 4b typically have a thickness normally of 0.02–0.3 mm in all the above embodiments, and in cases where a barrier layer 3 of aluminium foil is present, this has a thickness of 3–150 $\mu$m, normally greater than 10 $\mu$m, preferably a maximum of 40 $\mu$m.

Disclosure of Experiments Carried Out

Production of Laboratory Sheets

Laboratory sheets were produced with a bulk-promoting middle layer consisting of CTMP or TMP pulp of very high freeness and low density and containing latex binder and, on both sides of this middle layer, strong secondary layers of paper of a considerably higher density than the bulk layer. Both dry forming and wet forming of the bulk layer were tested. Different commercial papers of chemical sulphate cellulose pulp manufactured from bleached chemical softwood and/or hardwood sulphate pulp or paper grades of chemical pulp produced on an experimental paper machine were used as the secondary layers.

Dry Forming of Bulk Layer

CTMP fluff pulp was defibrated in a Kamas HO1 hammer mill using 6 mm screens at 4500 rpm. Forming of the bulk layer was achieved by dispersing the exposed fibres in air and forming, the fibres on a 100 mesh metal wire with a diameter of 25 cm.

Wet Forming of Bulk Layer

CTMP or TMP fibres were dispersed in water in a concentration of 0.6%. Sheets were formed in a sheet mould to A4 format. The sheets were couched against absorbent paper, the dry content increasing to approx. 20–25%. The sheets were then dried clamped by a drying felt against a cylinder with a surface temperature of 70° C. prior to application of binders and lamination to secondary layers.

Lamination

Latex binder containing 0.2 percent by weight sodium dodecyl sulphate (wetting agent) was applied to the dry- or wet-formed bulk layers by using a spray. The dry content of the binder in the spray can vary within broad limits, but unless otherwise indicated the dry content was approx 10%.

The secondary layers were moistened with water and/or sprayed with binder on the side which was intended to be placed against the bulk layer to avoid curl. The secondary layers were then put together with the bulk layer and 75 $\mu$m polythene film placed on each side to prevent migration of the water/binder. The polythene film was only used here as an aid in handling the samples and thus not caused to attach to these. The composite material was then pressed at a pressure and for a time suited to achieving the desired density, normally between 0.1 and 3 bar, and between 2 and 10 s.

Drying

The laminated sheets were dried clamped under drying felt against the surface of a cylinder dryer at a surface temperature of 70° C.

Test Methods and Definitions

The following describes a number of product attributes for describing the properties of the composite materials with regard to basis weight, thickness, density, tensile strength+ index, z-strength, flexural rigidity+index. Al attributes are measured in a standardized climate, 23 C. and 50% RH, using the following standardized SCAN methods. Unless otherwise stated regarding MR (machine direction) and TR (transverse direction) as regards the strength and elongation characteristics of the materials, the geometric mean value is always intended for machine and transverse direction.

| | |
|---|---|
| Basis weight | SCAN P 6:75 |
| Thickness - density | SCAN P 7:75 |
| Tensile strength - elongation, tensile stiffness | SCAN P 67:93 |
| Bending resistance | SCAN P 29:95 |
| Z-strength | SCAN P 80:98 |
| Air resistance, Gurley permeability | SCAN P 19:78 |
| Surface roughness, PPS | SCAN P 76:95 |
| Freeness | SCAN C 21:65 |
| Shopper - Riegler, SR | SCAN C 19:65 |

The bending stiffness index is calculated from the formulae below:

Bending stiffness index=$S^b/w^3$ ($Nm^7/kg^3$)

With a tape length of 50 mm, width of 38 mm and angle of 15° the following applies:

$S^b = F_B * 0.0837$ (mNm)

$F_B$=bending force (mN)

Stiffness according to Kenley and Taber is determined in geometric shaping of the samples and stretching which corresponds to the tape length of 50 mm used here with width 38 mm and angle 15°.

For converting Kenley stiffness to bending force, Iggesund's paperboard information (1979) gives:

Kenley bending force (g)=0.1*LoW (mN) which gives:
Bending stiffness index=Kenley*0.0837/0.1/basis weight$^3$ ($Nm^7/kg^3$)

To convert Taber stiffness to bending force, the stiffness conversion slide from Finnboard (1979) gives:

Taber (gcm)=0.465*LoW (mN) which gives:
Bending stiffness index=Taber*0.0837/0.465/basis weight$^3$ ($Nm^7/kg^3$)
LoW=Lorentzen & Wettre flexural rigidity meter (SCAN P29:95)

Experiment 1

To illustrate the significance of using a raw fibre material of high freeness in said bulk layer, an illustrative experiment was carried out using TMP and CTMP of varying freeness. It is clear from Table 1 that the density of sheets produced by wet forming, see above, drops with increasing freeness. It is also known that the strength of the fibre material generally is low at low densities. None the less, to achieve a layer of high bulk according to the invention, a freeness was selected as pulp preferably greater than 600 ml CSF, suitably greater than 650 ml CSF and best of all at least 700 ml CSF.

TABLE 1

| | | Pulp type | | |
|---|---|---|---|---|
| | | CTMP | CTMP | TMP |
| Freeness | (ml CSF) | 697 | 743 | 798 |
| Dry content after couch | (%) | 19.5 | 21.0 | 22.9 |
| Dry content after 1:a press | (%) | 43.4 | 40.6 | 50.2 |
| Dry content after 2:a press | (%) | 51.0 | 47.3 | 55.1 |
| Basis weight | (g/m2) | 102 | 102 | 100 |
| Thickness | (mm) | 0.51 | 0.64 | 0.70 |
| | (kg/m3) | 199 | 159 | 143 |

Press = 5 min or 2 min resp. at sheet pressure 1.1 kg/cm$^2$

Experiment 2

The effect of different basis weights and grades of secondary layers was investigated by laminating together a middle, dry-formed bulk layer with different secondary layers. The raw fibre material for the bulk-promoting middle layer was STORA Fluff CTMP 70 HD with a freeness of 697 CSF. The dry content following the addition of binders and lamination of the secondary layers to the bulk-promoting middle layer was approx. 30% before the drying process commenced.

The designation, composition and attributes of the different secondary layers is given in Table 2.

TABLE 2

| | | Different layers | | | | |
|---|---|---|---|---|---|---|
| | | Secondary layer, name: | | | | |
| | | 1 | 2 | 3 | 4 | 5 |
| Secondary layer, composition: | | X749:10 | X749:20 | X749:30 | X749:40 | Interleaving HT |
| Norrland 4 29.0 SR | % | 60 | 60 | | | |
| Norrland 4 26.0 SR | % | | | 60 | 60 | |
| Stora 61 33.0 SR | % | 40 | 40 | | | |
| Stora 61 28.0 SR | % | | | 40 | 40 | |
| Interleaving HT | % | | | | | 100 |
| Basis weight | g/m$^2$ | 52 | 2 | 53 | 2 | 39 |
| Thickness | μm | 96 | 79 | 94 | 80 | 59 |
| Density | kg/m$^3$ | 545 | 535 | 566 | 518 | 651 |
| Tensile strength MR | kN/m | 5.2 | 4.3 | 5.8 | 4.0 | 4.5 |
| Tensile strength TR | kN/m | 2.0 | 1.5 | 1.9 | 1.4 | 2.7 |
| Tensile index MR | Nm/g | 100 | 101 | 109 | 96 | 115 |
| Tensile index TR | Nm/g | 38 | 35 | 35 | 33 | 69 |
| Tensile stiffness MR | kN/m | 562 | 486 | 633 | 466 | 436 |

TABLE 2-continued

Different layers

| | | Secondary layer, name: | | | | |
|---|---|---|---|---|---|---|
| | | 1 | 2 | 3 | 4 | 5 |
| Secondary layer, composition: | | X749:10 | X749:20 | X749:30 | X749:40 | Interleaving HT |
| Tensile stiffness TR | kN/m | 194 | 154 | 207 | 160 | 264 |
| Tensile stiffness index MR | kNm/g | 10.7 | 11.5 | 11.9 | 11.2 | 11.3 |
| Tensile stiffness index TR | kNm/g | 3.7 | 3.7 | 3.9 | 3.8 | 6.8 |
| Elongation MR | % | 2.4 | 2.2 | 2.3 | 2.0 | 2.4 |
| Elongation TR | % | 5.3 | 4.3 | 4.4 | 3.3 | 2.9 |
| Air permeance, Gurley | μm/Pa * s | 5.0 | 5.7 | 7.2 | 11.4 | 3.2 |
| Air resistance, Gurley s | | 25.4 | 22.6 | 17.7 | 11.2 | 39.4 |
| Surface roughness PPS S 1.0 Mpa S1 | μm | 7.4 | 7.8 | 7.3 | 7.1 | 2.9 |
| Surface roughness PPS S 2.0 Mpa S1 | μm | 6.5 | 7.1 | 6.4 | 6.0 | 2.7 |

X749: 10–40 = Different paper grades produced for a 45 cm wide experimental paper machine from pulps of the type Norrland 4 and Stora 61.
Norrland 4 = Commercially bleached chemical softwood sulphate pulp from Stora Cell
Stora 61 = Commercially bleached chemical hardwood sulphate pulp from Stora Cell
Interleaving HT = Commercial paper grade of bleached chemical softwood and hardwood sulphate pulp from STORA Gruvon
MR = Machine direction
TR = Transverse direction Table 3 shows the properties of the laminates manufactured using a bulk-promoting middle layer of a fibre raw material consisting of STORA Fluff CTMP 70 HD with a freeness of 697 CSF and using different secondary layers as per Table 2. Column 1 shows the result for a material consisting only of the bulk-promoting middle layer, i.e. without secondary layers.

TABLE 3

Laminates with bulk-promoting middle layer and different secondary layers

| | | Secondary layer (as per Table 2): | | | | | |
|---|---|---|---|---|---|---|---|
| | | 1 None | 2 Interleaving HT | 3 X749:10 | 4 X749:20 | 5 X749:30 | 6 X749:40 |
| Secondary layer | | | | | | | |
| Basis weight | g/m² | | 39 | 52 | 42 | 53 | 42 |
| Thickness | μm | | 59 | 96 | 79 | 94 | 80 |
| Density | kg/m³ | | 651 | 545 | 535 | 566 | 518 |
| Binder: | | | | | | | |
| Appretan 0540 S | % | 25.0 | 14.1 | 11.9 | 13.6 | 12.1 | 13.4 |
| Basis weight, total | g/m² | 107 | 177 | 201 | 185 | 207 | 180 |
| Thickness | μm | 672 | 840 | 843 | 863 | 820 | 57 |
| Density | kg/m³ | 160 | 211 | 238 | 214 | 253 | 237 |
| Tensile strength | kN/m | 2.4 | 6.9 | 5.4 | 4.4 | 5.7 | 4.7 |
| Tensile index | Nm/g | 23 | 39 | 27 | 24 | 27 | 26 |
| Tensile stiffness | kN/m | 245 | 614 | 541 | 436 | 546 | 479 |
| Tensile stiffness index | kNm/g | 2.3 | 3.5 | 2.7 | 2.4 | 2.6 | 2.7 |
| Elongation | % | 1.7 | 3.4 | 3.8 | 3.7 | 4.0 | 3.2 |
| Bending resistance 50 mm 15° | mN | 94 | 485 | 470 | 454 | 478 | 381 |
| Bending resistance index 50 mm 15° | Nm⁶/kg³ | 75.5 | 87.1 | 58.2 | 71.9 | 53.6 | 66 |
| Bending stiffness index 50 mm 15° | Nm⁷/kg³ | 5.97 | 6.89 | 4.60 | 5.69 | 4.24 | 5.21 |
| Z-strength | kN/m² | 152 | 59 | 46 | 36 | 61 | 56 |
| Air permeance, Gurley | μm/Pa * s | 1524 | 1.3 | 2.4 | 1.8 | 3.6 | 6.1 |
| Air resistance, Gurley s | | 0.1 | 100 | 54.0 | 72.2 | 36.0 | 20.9 |

Appretan 0540 S is the trade name for a binder dispersion from Hoechst Perstorp, containing polyvinyl acetate as the active binder.

Of the secondary layers evaluated in Table 3, No. 5, Interleaving HT from STORA Gruvön, is the best choice. Thus in combination with the bulk-promoting middle layer of STORA Fluff CTMP 70 HD and with the addition of latex binder, which penetrated and was distributed in the bulk layer in the manner described earlier, the secondary layer Interleaving HT yielded a bending stiffness index of 6.89 $Nm^7/kg^3$. Other paper grades manufactured from chemical paper pulp based on hardwood and/or softwood fibre also appear to be well suited to use as secondary layers on the bulk layer, also secondary layers of material produced on an experimental paper machine (nos. 3–6 in Table 3), in that in combination with the bulk layer impregnated with binder they yielded a considerably higher bending stiffness index than hitherto known commercial paperboard material.

Experiment 3

A series of binders was evaluated with regard to suitable properties for maximizing the stiffness of a laminate according to the invention using a dry-formed bulk layer as the middle layer. The raw fibre material in this case also was STORA Fluff CTMP 70 HD with a freeness of 697 ml CSF. Interleaving HT 40 $g/m^2$ from STORA Gruvön formed secondary layers on both sides. The paper attributes of this secondary layer were shown previously in Table 3, No. 5. The dry content following the addition of binder and lamination of the secondary layers was approx. 30% prior to the drying process. The results are clear from Table 4.

PNIACR=Polymethyl metacrylate PE=Polyethylene PVOH=Polyvinyl alcohol DBM=Dibutyl maleinate It is evident from Table 4 that the choice of binder considerably influences the properties of the laminate, especially the bending stiffness index, in spite of the fact that all the binders tested are of the latex type. There may be several basic technical reasons for the variations. For example, the viscosity and surface tension of the binder can affect the distribution of the binder and its action in the laminate. Furthermore, attributes of the polymers, such as mechanical strength and adhesion to the fibre materials, probably affect the final properties of the laminate. A low viscosity furthers good penetration into the thick, bulk-promoting middle layer. On the other hand, a low viscosity in the boundary layer to the secondary layers can promote good adhesion and thereby good consolidation of the laminate. The highest bending stiffness index was achieved using Appretan 0540 S and Appretan TS as binders, column 1 and 2 in Table 4, which are of medium viscosity. Regardless of the fundamental reasons, Table 4 shows that a bending stiffness index has been achieved in the laminate according to the invention which considerably surpasses today's level of flexural rigidity in commercial material. For example, Triplex (trade name) paperboard from STORA Skoghall, which is used to a very large extent for liquid packagings, has a bending stiffness index of 1.3 $Nm^7/kg^3$. Furthermore, Fellers and Norman mention in Papersteknik, third edition, 1996, pp. 315–318, that paper material normally has a bending stiffness index of between 0.5 and 2 $Nm^7/kg^3$.

The bending stiffness index according to the invention

TABLE 4

Laminate consisting of bulk-promoting middle layer of STORA Fluff CTMP 70 HD, freeness 697 ml CSF and secondary layers of Interleaving HT with various binders

| Binder: | | 1<br>Appretan<br>0540 S | 2<br>Appretan<br>TS | 3<br>Appretan<br>TH 210 S | 4<br>Appretan<br>DM2 | 5<br>Appretan<br>TA 2270 S | 6<br>Appretan<br>TA 2370 S | 9<br>Appretan<br>9606 |
|---|---|---|---|---|---|---|---|---|
| Properties of binders: | | | | | | | | |
| $T_g$ | ° C. | 29 | 29 | 28 | 10 | 50 | 50 | 6 |
| MFT | ° C. | 18 | 18 | | 7 | 60 | 50 | 0 |
| Viscosity* | mPa · S | 500–2000 | 1000–4000 | 100–700 | 3500–8500 | 100–1300 | 100–1300 | 5500–9500 |
| Active polymer | | PVAC | PVAC | PVAC XL | PVAC/DBM/PVOH | PS/PACR | PMACR/PACR | PVAC/PE |
| Quantity of binder** | % | 25 | 25 | 25 | 25 | 25 | 25 | 25 |
| Properties of laminate: | | | | | | | | |
| Basis weight | $g/m^2$ | 173 | 170 | 167 | 169 | 169 | 167 | 168 |
| Thickness | μm | 645 | 706 | 668 | 677 | 708 | 748 | 704 |
| Density | $kg/m^3$ | 268 | 241 | 250 | 249 | 239 | 223 | 239 |
| Basis weight middle layer, tot. (calculated for bulk layer, total) | $g/m^2$ | 103 | 100 | 97 | 99 | 99 | 97 | 98 |
| Density - " - | $kg/m^3$ | 196 | 170 | 177 | 177 | 168 | 154 | 168 |
| Tensile strength | kN/m | 6.7 | 6.3 | 5.8 | 6.4 | 5.1 | 6.1 | 5.8 |
| Tensile index | Nm/g | 39 | 37 | 35 | 38 | 30 | 36 | 34 |
| Tensile stiffness | kN/m | 560 | 553 | 473 | 486 | 499 | 607 | 426 |
| Tensile stiffness index | kNm/g | 3.2 | 3.3 | 2.8 | 2.9 | 3.0 | 3.6 | 2.5 |
| Elongation (mean value of MR and TR) | % | 3.8 | 3.9 | 4.3 | 4.8 | 3.7 | 3.1 | 4.6 |
| Bending resistance 50 mm 15° | mN | 460 | 372 | 147 | 314 | 214 | 219 | 999 |
| Bending resistance index 50 mm 15° | $Nm^6/kg^3$ | 89 | 76 | 32 | 65 | 44 | 47 | 38 |
| Bending stiffness index 50 mm 15° | $Nm^7/kg^3$ | 7.02 | 6.00 | 2.50 | 5.16 | 3.51 | 3.74 | 2.98 |
| z-strength | $kN/m^2$ | 122 | 44 | 14 | 98 | 11 | 18 | 45 |

TG=Glass transition temperature MFT=Minimum film forming temperature
*Brook field viscometer RVT, spindle 2;20 rpm for TH 210 S. (according to data sheet) TA 2270 S and TA 2370 S. , spindle 3,20 rpm for 0540 S and TS. spindle 5;20 rpm for DM 2 and 9606. **calculated percentage of weight of middle layer. Appretan=trade name for binder dispersions from Hoechst Perstorp PVAC=Polyvinyl acetate PS=Polystyrene PACR=Polyacrylate also considerably exceeds the values known in literature for material produced by dry forming. This is probably caused by the choice of raw fibre material with a high freeness, which is combined with a process (mainly In conjunction with press and dryer) which means that the density of the laminate can be kept low.

The binders which are to be preferred for use in laminate according to the invention should have a glass conversion temperature which is higher than 0° C., and the polymers should in addition have been produced by polymerization of ethylene, propylene, butene, vinyl chloride, vinyl acetate, acrylates such as methyl metacrylate, ethyl metacrylate etc. and as copolymers. In these latex binders both surface-active agents and e.g. polyvinyl alcohol and carboxymethyl cellulose can also be used as additives to stabilize the dispersion of polymers in the water. These and similar substances, e.g. starch, also serye as binders.

Experiment 4

With the aim of investigating the effect of density and the content of binder in the laminate, a series of experiments was carried out in which these variables were varied. Dry-formed bulk layers were used as the middle layer, the raw fibre material being STORA Fluff CTMP 70 HD with a freeness of 697 CSF. The secondary layers were formed by Interleaving HT 40 g/m² from STORA Gruvön, paper attributes as per Table 2, column 5. The binder used was Appretan 540S, which was added to the middle layer. The dry content following the addition of binder and lamination of the surface layer was approx. 30% before the drying process was started. The results are shown in Table 5.

pulp) with a freeness of 743 ml CSF were wet-formed following dispersion of the fibres in water to form bulk-promoting middle layers in laminates according to the invention. The TMP pulp contained 10% chemical pulp ground to ≈27° SR mixed with 90% TMP pulp with a freeness of 798 ml CSF. The addition of chemical pulp reduced the freeness somewhat, but the result was nevertheless a bulk layer with a high freeness value according to the invention. The middle layers were laminated to the secondary layers which were consisted of the above named paper layers of Interleaving HT quality from STORA Gruvön with paper attributes as per Table 2, column 5. For lamination the binder Appretan 540S was added to the bulk layer. The dry content following addition of the binder and lamination of the surface layers was approx. 30% before the drying process was started.

It is clear from the results in Table 6 that the bending stiffness index for laminates with wet-formed, bulk-promoting layers of low density also considerably surpasses presently known commercial materials. It is also evident from Table 6 that a high bending stiffness index is obtained for laminates with bulk layers of relatively low basis weight even when using low quantities of binder.

TABLE 5

Varying density and quantity of binder in the laminate, consisting of dry-formed bulk layer, freeness 697 ml CSF with secondary layer of Interleaving HT

|  |  | 1 | 2 | 3 | 4 | 5 | 6 |
|---|---|---|---|---|---|---|---|
| Quantity of binder* | % | 25 | 25 | 35 | 35 | 30 | 20 |
| Quantity of binder** | % | 14.6 | 14.5 | 19.7 | 19.7 | 17.1 | 11.8 |
| Density of bulk-promoting middle layer, guide value | kg/m³ | 160 | 220 | 160 | 220 | 200 | 160 |
| Density of bulk-promoting middle layer (calc.) | kg/m³ | 160 | 227 | 180 | 236 | 206 | 175 |
| Basis weight, bulk-promoting middle layer (calc.) | g/m² | 98 | 96 | 101 | 101 | 104 | 100 |
| Properties of the laminate: |  |  |  |  |  |  |  |
| Basis weight | g/m² | 168 | 166 | 179 | 179 | 182 | 170 |
| Thickness | μm | 731 | 540 | 705 | 574 | 648 | 690 |
| Density | kg/m³ | 229 | 307 | 253 | 312 | 280 | 246 |
| Tensile strength | kN/m | 7.5 | 7.8 | 7.4 | 8.5 | 8.1 | 7.2 |
| Tensile index | Nm/g | 45 | 47 | 42 | 47 | 45 | 43 |
| Tensile stiffness | kN/m | 642 | 658 | 642 | 749 | 703 | 592 |
| Tensile stiffness index | kNm/g | 3.8 | 4.0 | 3.6 | 4.2 | 3.9 | 3.5 |
| Elongation | % | 3.7 | 3.9 | 3.4 | 3.6 | 3.6 | 3.9 |
| Bending resistance 50 mm 15° | mN | 446 | 346 | 502 | 495 | 521 | 443 |
| Bending resistance index 50 mm 15° | Nm⁶/kg³ | 95 | 76 | 88 | 86 | 87 | 91 |
| Bending stiffness index 50 mm 15° | Nm⁷/kg³ | 7.49 | 6.03 | 6.97 | 6.8 | 6.88 | 7.18 |
| z-strength | kN/m² | 65 | 140 | 63 | 168 | 158 | 47 |

*calculated percentage of the weight of the bulk-promoting middle layer
**calculated percentage of the weight of the laminate It is clear from Table 5 that increasing density gives lower flexural rigidity but increased z-strength, i.e. strength in the thickness direction of the laminate. The table indicates that the content of binder can be varied within relatively broad limits in order together with the product density to form a basic control variable for the properties of the laminate. In all densities and binder percentages evaluated the bending stiffness index of the laminates considerably surpasses previously known commercial materials.

Experiment 5

A TMP pulp (thermomechanical pulp) with a freeness of 798 ml CSF and a CTMP pulp (chemithermomechanical

TABLE 6

Wet-formed bulk layer, laminated on both sides with machine-glazed paper

|  |  | 1 | 3 | 4 | 5 | 6 | 7 | 8 |
|---|---|---|---|---|---|---|---|---|
| Pulp in middle layer: |  | TMP** | TMP** | CTMP*** | CTMP*** | CTMP*** | CTMP*** | CTMP*** |
| Amount of laminating agent, guide value | % | 25 | 25 | 25 | 10 | 10 | 15 | 15 |
| Amount of binder, middle layer |  | 23 | 24 | 22 | 9 | 11 | 14 | 17 |
| Amount of binder | % | 13 | 12 | 11 | 3.3 | 6.0 | 5.1 | 9.3 |
| Basis weight | g/m² | 175 | 158 | 162 | 128 | 180 | 128 | 181 |
| Thickness - single sheet | μm | 735 | 630 | 619 | 400 | 690 | 398 | 772 |
| Density - single sheet | kg/m³ | 239 | 251 | 261 | 319 | 262 | 322 | 235 |
| Thickness STFI | μm | 760 | 642 | 606 | 376 | 720 | 401 | 769 |
| Density STFI | kg/m³ | 231 | 246 | 266 | 340 | 250 | 320 | 236 |
| Basis weight middle layer, tot. (calc.) | g/m² | 96 | 78 | 82 | 48 | 101 | 49 | 102 |
| Density, middle layer, single sheet (calc.) | kg/m³ | 152 | 150 | 159 | 169 | 175 | 172 | 155 |
| Density, middle layer - STFI (calc.) |  | 146 | 146 | 164 | 184 | 167 | 170 | 155 |
| Tensile strength | kN/m | 11 | 8 | 12 | 8 | 9 | 8 | 10 |
| Tensile index | Nm/g | 60 | 51 | 76 | 64 | 50 | 65 | 52 |
| Tensile stiffness | kN/m | 878 | 751 | 1033 | 708 | 766 | 755 | 811 |
| Tensile stiffness index | kNm/g | 5.0 | 4.8 | 6.4 | 5.6 | 4.3 | 5.9 | 4.5 |
| Elongation | % | 3.2 | 3.1 | 2.8 | 3.5 | 3.3 | 3.2 | 3.3 |
| Bending resistance 50 mm 15° | Mn | 480 | 472 | 449 | 203 | 461 | 179 | 459 |
| Bending resistance index 50 mm 15° | Nm⁶/kg³ | 89 | 119 | 107 | 103 | 83 | 90 | 82 |
| Bending stiffness index 50 mm 15° | Nm⁷/kg³ | 7.0 | 10.0 | 8.9 | 7.7 | 6.3 | 6.7 | 6.1 |
| z-strength | kN/m² | 89 | 74 | 107 | 55 | 44 | 63 | 60 |

*calculated percentage of sheet's whole weight
Surface layer: Sample 1 = Interleaving HT 136 110-Im 5/2-98
Surface layer: Samples 3–4 = Interleaving HT-1, 14/5-98. Samples 5–8 = Interleaving HT-I 4/6-98
**TMP with 10% ground chemical pulp (80% St, 32.20% St.61) ground to −26°, freeness TMP = 798 ml
***CTMP with freeness 743 ml
Unequal values of z-strength

Experiment 6

The dry content included for thermal drying was relatively low in the previous experiments, approx. 30%. As a way of developing the process for manufacturing the laminates on a commercial scale, experiment 6 aims to increase the dry content of latex binder on spray application to the bulk layer and thereby reduce the quantity of water in the laminate on pressing. Dry-formed CTMP fluff was used as the bulk-promoting middle layer and the secondary layers consisted of 40 g Interleaving HT produced from bleached chemical softwood and hardwood sulphate pulp. The 15% binder was added by spraying to the bulk-promoting middle layer prior to lamination to the secondary layers. The results are shown in Table 7.

TABLE 7

Experiment with higher dry content in the laminate prior to drying

| Amount of binder* | % | 14.0 | 14.0 |
|---|---|---|---|
| Dry content prior to drying, tot. | % | 35 | 40 |
| Density, guide value; bulk-promoting middle layer | kg/m³ | 200 | 200 |
| Properties of laminate: |  |  |  |
| Basis weight, bulk-promoting middle layer tot. | g/m³ | 103 | 102 |
| Density, bulk-promoting middle layer (calc.) | kg/m³ | 204 | 191 |
| Basis weight | g/m² | 182 | 181 |
| Thickness | μm | 609 | 638 |
| Density | kg/m³ | 300 | 284 |
| Tensile strength** | kN/m | 12.6 | 10.9 |
| Tensile index | Nm/g | 69 | 60 |
| Tensile stiffness | kN/m | 1026 | 928 |
| Tensile stiffness index | kNm/g | 5.6 | 5.1 |
| Elongation | % | 3.1 | 2.9 |
| Bending resistance 50 mm 15° | mN | 425 | 394 |
| Bending resistance index 50 mm 15° | Nm⁶/kg³ | 70 | 66 |
| Bending stiffness index 50 mm 15° | Nm⁷/kg³ | 5.9 | 5.5 |
| z-strength | kN/m² | 184 | N.A.*** |

*Calculated percentage of total basis weight
**Tensile strength only tested in machine direction, MR
***N.A. = not analyzed It is evident from the results in Table 7 that even with a dry content of 35 and 40% a material is obtained with a very high bending stiffness index, which considerably surpasses the bending stiffness index of currently known commercial materials.

Experiment 7

Figure 8:
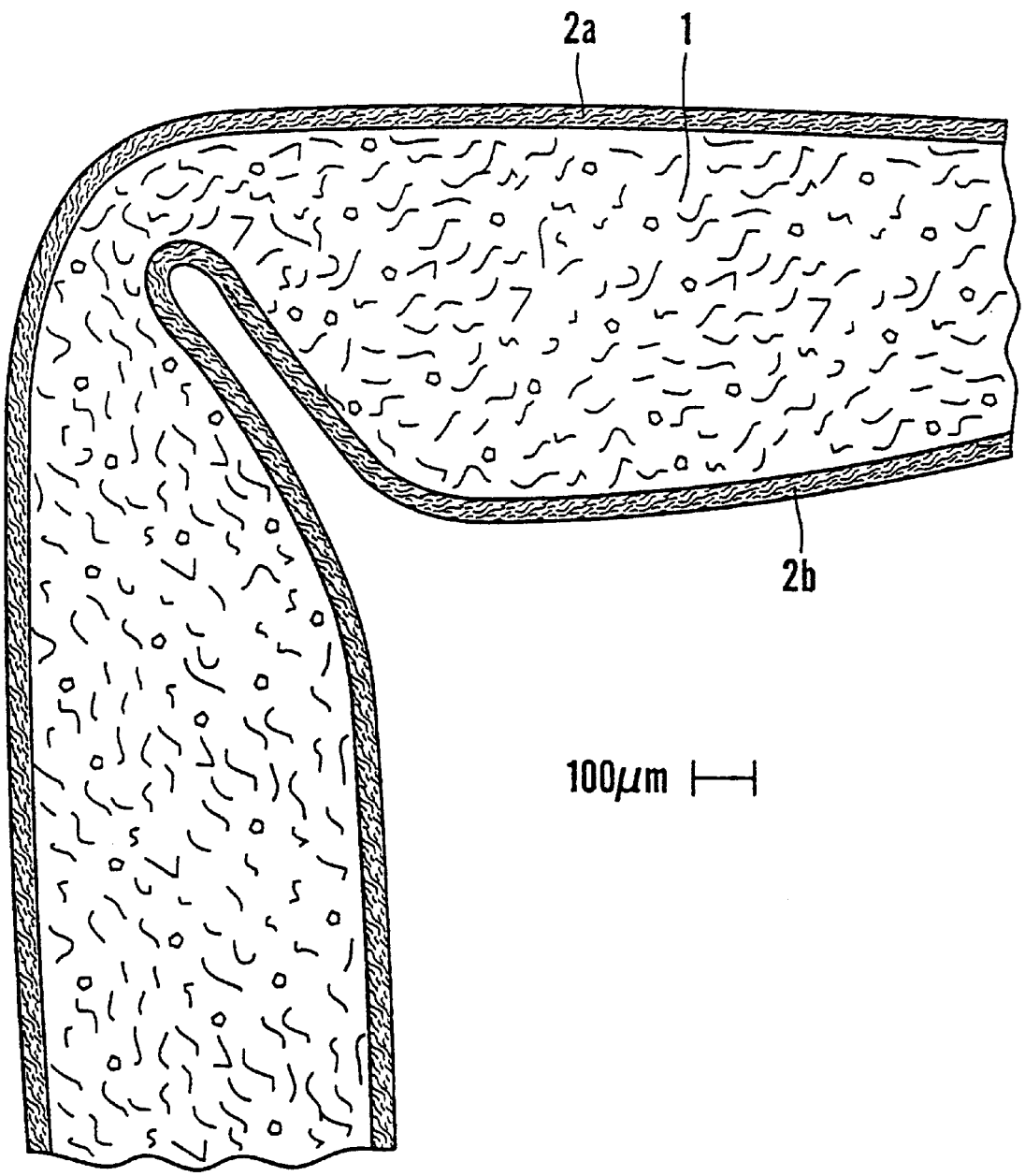
FIG. 8 is an image made from a photograph of a scored part of a laminate according to the invention and shows how the laminate looks after having been scored and folded 90° with permanent deformation of the bulk layer but without delamination or cracks in the secondary layers.

The conversion properties of a packaging material, i.e. the material's suitability for being capable of reshaping into packagings in machines working at high speed, often continuously, is difficult to evaluate on the basis of small quantities of material produced in the laboratory. Foldability and creasability however are essential attributes of packaging material and can also be studied when only small quantities of material are available. To evaluate these attributes, a material according to the invention has been studied, more precisely the laminate manufactured in Experiment 3 above, Table 4, column 1. The material was scored and then folded 90° in the score line. FIG. 8 shows the scored material. It is evident from the picture that it is possible to crease the material 90° towards the fold impression without it delaminating or cracks occurring. However, it is equally possible to crease the material without hindrance in the other direction, i.e. away from the fold impression. The low density of the bulk-promoting middle layer 1 makes it possible to achieve permanent deformation of the middle layer. The secondary layers 2a and 2b have sunk into the middle layer 1, for which reason shear deformation to the side of the fold is avoided. Shear deformation of this kind manifests itself in a conventional laminate as outward bulges, which cause delamination and/or transfer of the material in the bulk layer, or cracking in the secondary layer, in subsequent conversion operations.

The laminate's permanent reduction in thickness on folding is at least 10%, preferably at least 20%.

The invention is not restricted to the embodiments described above, nor is it limited by the experiments described, but can be varied within the scope of the claims.

What is claimed is:

1. Paper or paperboard laminate composed of at least one bulk-promoting layer, and on at least one side of said bulk layer at least one secondary layer, said secondary layer and said bulk layer being joined to one another directly or indirectly over basically the whole of their surfaces facing one another, wherein 40–95% of said bulk layer consists of cellulose fibers with a freeness of 550–950 ml CSF, said at least one secondary layer having a greater density than said bulk layer, and said laminate having a bending stiffness index higher than 2.5 $Nm^7/kg^3$, but less than 14 $Nm^7/kg^3$, calculated as a geometric mean value for machine and transverse direction.

2. Paper or paperboard laminate according to claim 1, wherein at least 60% of the bulk layer consists of fibers with a freeness value higher than 600 ml CSF, and the laminate has a bending stiffness index higher than 3.0 $Nm^7/kg^3$.

3. Paper or paperboard laminate according to claim 2, wherein at least 60% of the bulk layer consists of fibers with a freeness value higher than 650, but less than 850 ml CSF, and the laminate has a bending stiffness index higher than 4.0 $Nm^7/kg^3$.

4. Paper or paperboard laminate according to claim 3, wherein at least 60% of the bulk layer consists of fibers with a freeness value of at least 700, but less than 850 ml CSF, and the laminate has a bending stiffness index higher than 4.0 $Nm^7/kg^3$.

5. Paper or paperboard laminate according to claim 3, wherein the laminate has a bending stiffness index higher than 5.0 $Nm^7/kg^3$ calculated as a geometric mean value for machine and transverse direction.

6. Paper or paperboard laminate according to claim 1, wherein the bulk layer has a density of 50–300 $kg/m^3$.

7. Paper or paperboard laminate according to claim 6, wherein the bulk layer has a density of 70–200 $kg/m^3$.

8. Paper or paperboard laminate according to claim 6, wherein the bulk layer has a density of 100–180 $kg/m^3$.

9. Paper or paperboard laminate according to claim 1, wherein said secondary layers have a density which is at least twice as great as the density of the bulk layer.

10. Paper or paperboard laminate according to claim 9, wherein said secondary layers have a density which is at least three times as great as the density of the bulk layer.

11. Paper or paperboard laminate according to claim 9, wherein said secondary layers have a density which is at least four times as great as the density of the bulk layer.

12. Paper or paperboard laminate according to claim 6, wherein said secondary layers have a density of 300–1500 $kg/m^3$.

13. Paper or paperboard laminate according to claim 12, wherein said secondary layers have a density of 400–850 $kg/m^3$.

14. Paper or paperboard laminate according to claim 5, wherein the laminate has a density of 100–500 $kg/m^3$.

15. Paper or paperboard laminate according to claim 14, wherein the laminate has a maximum density of 400 $kg/m^3$.

16. Paper or paperboard laminate according to claim 14, wherein the laminate has a density of 125–350 $kg/m^3$.

17. Paper or paperboard laminate according to claim 14, wherein the laminate has a density of 150–250 $kg/m^3$.

18. Paper or paperboard laminate according to claim 15, wherein the laminate has a density of 200–400 $kg/m^3$.

19. Paper or paperboard laminate according to claim 18, wherein the laminate has a density of 250–350 $kg/m^3$.

20. Paper or paperboard laminate according to claim 6, wherein the laminate has a density of 300–500 $kg/m^3$.

21. Paper or paperboard laminate according to claim 20, wherein the laminate has a density of 350–450 $kg/m^3$.

22. Paper or paperboard laminate according to claim 1, wherein the cellulose fibers in the bulk layer consist mainly of cellulose fibers produced by means of a pulp production method which is mechanical, thermomechanical or chemithermomechanical.

23. Paper or paperboard laminate according to claim 22, wherein the wood yield is >75%.

24. Paper or paperboard laminate according to claim 22, wherein the wood yield is >80%.

25. Paper or paperboard laminate according to claim 22, wherein the cellulose fibers in the bulk layer consist mainly of fibers of TMP and/or CTMP pulp with said freeness value.

26. Paper or paperboard laminate according to claim 25, wherein the bulk layer, apart from fibers of at least TMP- and/or CTMP-high-yield pulp, contains a total of 40% maximum, calculated in dry weight, of chemical pulp and/or beaten, mainly dried-out fiber from paper and paperboard laminate.

27. Paper or paperboard laminate according to claim 25, wherein the fibers in the bulk layer, apart from fibers of at least TMIP- and/or CTMP-high-yield pulp, comprise a maximum of 30% percentage by weight of synthetic resilient fiber.

28. Paper or paperboard laminate according to claim 27, wherein the fibers in the bulk layer, apart from fibers of at least TMIP- and/or CTMP-high-yield pulp, comprise a maximum of 30% percentage by weight of synthetic resilient fiber of any polymer belonging to the group of polymers which includes polyethylene, polypropylene and polyester, and/or a maximum of 30% of chemically cross-linked softwood fibers.

29. Paper or paperboard laminate according to claim 1, wherein at least one of said secondary layers consists mainly of bleached or unbleached chemical sulphate, sulphite or organosolv pulp.

30. Paper or paperboard laminate according to claim 29, wherein said secondary layers consist mainly of bleached or unbleached chemical cellulose pulp produced from a raw cellulose material consisting of mainly softwood and/or hardwood.

31. Paper or paperboard laminate according to claim 1, wherein the laminate, at least on one side of the bulk layer, has a secondary layer, which is formed by a paper material permeable to steam, formed from a stock with a dewatering resistance higher than 200 SR but less than 650 SR, and wherein the laminate on the opposite side of the bulk layer has at least a third layer which consists of a material which is considerably less permeable to steam than said secondary layer of paper material permeable to steam formed from a stock with said dewatering resistance.

32. Paper or paperboard laminate according to claim 31, wherein the stock has a dewatering resistance higher than 250 SR but not higher than 400 SR.

33. Paper or paperboard laminate according to claim 1, wherein at least one of said secondary layers is formed from a paper material which has been formed and pressed in one or more separate stages before it is joined to the bulk layer.

34. Paper or paperboard laminate according to claim 31, wherein said at least third layer is formed by a polymer film, metal foil, or metallized polymer film.

35. Paper or paperboard laminate according to claim 34, wherein said metal foil is aluminum foil.

36. Paper or paperboard laminate according to claim 34, wherein said third layer is formed by a polymer film of a polymer selected from the group consisting of polyethylene, polypropylene, polybutene, polyester, polyvinyl chloride, polyvinylidene chloride, polyvinyl chloride/polyvinylidene chloride, polyvinyl alcohol, polyethylene vinyl alcohol co-polymer, ethylene vinyl acetate co-polymer and cellulose esters.

37. Paper or paperboard laminate according to claim 36, wherein said third layer is formed by a polymer film which has a yield point which exceeds 130° C., lamination of the polymer film being carried out directly to the bulk layer.

38. Paper or paperboard laminate according to claim 1, wherein the bulk layer has a basis weight of 30–300 g/m$^2$, that said at least one secondary layer has a basis weight of 30–150 g/m$^2$, and that the laminate has a basis weight of 50–500 g/m$^2$.

39. Paper or paperboard laminate according to claim 38, wherein the bulk layer has a basis weight of 40–80 g/m$^2$.

40. Paper or paperboard laminate according to claim 38, wherein the bulk layer has a basis weight of 70–120 g/m$^2$.

41. Paper or paperboard laminate according to claim 38, wherein the bulk layer has a thickness of 0.1–6 mm.

42. Paper or paperboard laminate according to claim 41, wherein the bulk layer has a thickness of 0.2–1.0 mm.

43. Paper or paperboard laminate according to claim 41, wherein the bulk layer has a thickness of 0.3–0.7 mm.

44. Paper or paperboard laminate according to claim 38, wherein the laminate has a basis weight of 50–500 g/m$^2$.

45. Paper or paperboard laminate according to claim 44, wherein the laminate has a basis weight of 90–200 g/m$^2$.

46. Paper or paperboard laminate according to claim 1, wherein it has a tensile index of 25–150 Nm/g.

47. Paper or paperboard laminate according to claim 1, wherein it has a tensile index of 50–100 Nm/g.

48. Paper or paperboard laminate according to claim 1, wherein said at least one secondary layer has a thickness which amounts to 5–20% of the thickness of the bulk layer.

49. Paper or paperboard laminate according to claim 48, wherein said at least one secondary layer has a thickness which amounts to at most 15% of the bulk layer.

50. Paper or paperboard laminate according to claim 48, wherein said at least one secondary layer has a thickness which amounts to a maximum of 10% of the thickness of the bulk layer.

51. Paper or paperboard laminate according to claim 1, wherein the bulk layer is joined to the other layer/layers included in the laminate in pressing, this pressing being carried out so that the bulk layer retains or acquires a density within the said density limits for the bulk layer.

52. Paper or paperboard laminate according to claim 1, wherein the bulk layer is formed by means of dry forming.

53. Paper or paperboard laminate according to claim 1, wherein the bulk layer is formed by means of wet forming.

54. Paper or paperboard laminate according to claim 1, wherein the bulk layer also comprises at least one binder in a percentage of 1–30% of the laminate's weight, calculated as dry weights.

55. Paper or paperboard laminate according to claim 54, wherein the bulk layer also comprises a latex binder.

56. Paper or paperboard laminate according to claim 54, wherein the bulk layer also comprises said binder in a percentage of 5–30% of the laminate's weight, calculated as dry weights.

57. Paper or paperboard laminate according to claim 54, wherein the bulk layer also comprises said binder in a percentage of 7–30% of the laminate's weight, calculated as dry weights.

58. Paper or paperboard laminate according to claim 1, wherein the bulk layer also comprises said binder in a percentage of 10–20% of the laminate's weight, calculated as dry weights.

59. Paper or paperboard laminate according to claim 1, wherein the laminate is consolidated by the addition of binder to principally the bulk layer in a percentage of 1–30% of the laminate's weight, calculated in dry weights, followed by pressing and drying.

60. Paper or paperboard laminate according to claim 59, wherein the laminate is consolidated by the addition of binder to principally the bulk layer in a percentage of 5–30% of the laminate's weight, calculated in dry weights, followed by pressing and drying.

61. Paper or paperboard laminate according to claim 59, wherein the laminate is consolidated by the addition of binder to principally the bulk layer in a percentage of 7–30% of the laminate's weight, calculated in dry weights, followed by pressing and drying.

62. Paper or paperboard laminate according to claim 59, wherein the laminate is consolidated by the addition of binder to principally the bulk layer in a percentage of 10–20% of the laminate's weight, calculated in dry weights, followed by pressing and drying.

63. Paper or paperboard laminate according to claim 1, wherein the bulk layer has a basis weight of 30–100 g/m$^2$, the percentage of binder being 1–5% of the laminate's weight, calculated as dry weights.

64. Paper or paperboard laminate according to claim 63, wherein the bulk layer has a basis weight of 30–80 g/m$^2$ calculated as dry weights.

65. Paper or paperboard laminate according to claim 63, wherein the percentage of binder is 2–5% of the laminate's weight, calculated as dry weights.

66. Paper or paperboard laminate according to claim 54, wherein said binder comprises at least a binder selected from the group consisting of water-soluble polymers, polymers dispersed in water, starch, carboxymethyl cellulose and gums.

67. Paper or paperboard laminate according to claim 66, wherein said binder comprises at least a binder selected from the group consisting of polyvinyl acetate, polyvinyl alcohol, polyacrylates, polyacrylic acid, polyethylene, polyacrylamide, polystyrene and maleic acid derivatives in the form of homo- and co-polymers of said polymers.

68. Paper or paperboard laminate according to claim 66, wherein said binder selected from the group consisting of starch, carboxymethyl cellulose and gums forms an adhesive agent between the bulk layer and said at least one secondary layer.

69. Paper or paperboard laminate according to claim 1, wherein the laminate following folding has a permanent reduction in thickness of at least 10% in the bulk layer in the area of the fold, which makes creasing easier without delamination occurring to a significant extent or cracks occurring in the outermost layers in connection with the fold.

70. Paper or paperboard laminate according to claim 69, wherein the laminate following folding has a permanent reduction in thickness of at least 20% in the bulk layer in the area of the fold.

71. Method of producing a paper or paperboard laminate composed of at least one bulk-promoting layer, here termed the bulk layer, and on at least one side of the bulk layer at least one secondary layer, secondary layer and bulk layer being joined to one another directly or indirectly over basically the whole of their surfaces facing one another, wherein chosen or produced as the bulk layer (1) is a layer of which 40–95 percent by weight consists of cellulose fibers with a freeness of 550–950 ml CSF, which bulk layer is joined at least on its one side directly or indirectly to a secondary layer (2a, 2b), which has a greater density than the bulk layer, to form a laminate with a bending stiffness index higher than 2.5 $Nm^7/kg^3$, but lower than 14 $Nm^7/kg^3$, calculated as a geometric mean value for machine and transverse direction.

72. Method according to claim 71, wherein said cellulose fibers in the bulk layer have a freeness value higher than 600 ml CSF.

73. Method according to claim 72, wherein said cellulose fibers in the bulk layer have a freeness value higher than 650 but less than 850 ml CSF.

74. Method according to claim 72, wherein said cellulose fibers in the bulk layer have a freeness value at least 700 ml CSF but less than 850 ml CSF.

75. Method according to claim 71, wherein chosen as at least any secondary layer is a paper material with a density which is at least twice as great as the density of the bulk layer.

76. Method according to claim 75, wherein chosen as at least any secondary layer is a paper material with a density which is at least three times as great as the density of the bulk layer.

77. Method according to claim 75 wherein chosen as at least any secondary layer is a paper material with a density which is at least four times as great as the density of the bulk layer.

78. Method according to claim 71, wherein the bulk layer on lamination to the secondary layers to form a consolidated laminate is only compressed to such a degree and/or caused to spring back to such a great degree that the density of the bulk layer in the laminate following drying is held at 50–300 $kg/m^3$.

79. Method according to claim 78, wherein the density of the bulk layer in the laminate following drying is held at 70–200 $kg/m^3$.

80. Method according to claim 78, wherein the density of the bulk layer in the laminate following drying is held at 100–180 $kg/m^3$.

81. Method according to claim 71, wherein added to the bulk layer and/or the secondary layer/layers is binder in a quantity of 1–30%, calculated as dry weights, no later than before the layers are joined to one another, the majority of said binder being caused to penetrate and be distributed in the bulk layer.

82. Method according to claim 81, wherein added to the bulk layer and/or the secondary layer/layers is binder in a quantity of 5–30% of the laminate's weight, calculated as dry weights.

83. Method according to claim 81, wherein added to the bulk layer and/or the secondary layer/layers is binder in a quantity of 7–30% of the laminate's weight, calculated as dry weights.

84. Method according to claim 81, wherein added to the bulk layer and/or the secondary layer/layers is binder in a quantity of 10–20% of the laminate's weight, calculated as dry weights.

85. Method according to claim 71, wherein binder in a quantity of 1–5% of the laminate's weight is added to the bulk layer and/or to the secondary layer/layers.

86. Method according to claim 85, wherein binder in a quantity of 2–5% of the laminate's weight is added to the bulk layer.

87. Method according to claim 85, wherein the laminate has a basis weight of the bulk layer of 30–100 $g/m^2$.

88. Method according to claim 85, wherein the laminate has a basis weight of the bulk layer of 30–80 $g/m^2$.

* * * * *